United States Patent [19]

Moisan

[11] Patent Number: 4,573,281
[45] Date of Patent: Mar. 4, 1986

[54] AUDIBLE AND VISUAL INDICATOR

[76] Inventor: Louis E. Moisan, 1920 N. Main St., Lancaster, Mass. 01523

[21] Appl. No.: 691,115

[22] Filed: Jan. 14, 1985

[51] Int. Cl.⁴ .............................................. A01K 97/12
[52] U.S. Cl. ...................................................... 43/17
[58] Field of Search ................................. 43/17, 16, 15

[56] References Cited

U.S. PATENT DOCUMENTS

| | | | |
|---|---|---|---|
| 3,199,241 | 8/1965 | Mauritz | 43/17 |
| 3,881,269 | 5/1975 | Timmons | 43/15 |
| 4,520,586 | 6/1985 | Moisan | 43/17 |

FOREIGN PATENT DOCUMENTS 804741 10/1936 France ...................................... 43/17

*Primary Examiner*—Nicholas P. Godici
*Assistant Examiner*—G. M. Reid
*Attorney, Agent, or Firm*—Charles R. Fay

[57] ABSTRACT

An audible and visual signal for an indicator for fishing in which the signal includes a resilient wire and a releasable line catch which holds the resilient wire. The indicator is to be mounted on a fishing rod in either of two positions: in one position the line catch is co-planar with respect to the rod and in the other position, the line catch is offset therefrom.

9 Claims, 7 Drawing Figures

AUDIBLE AND VISUAL INDICATOR

FIELD OF THE INVENTION

An indicator for alerting a fisherman that a fish has taken the bait on a hook attached to his line.

BACKGROUND OF THE INVENTION

There have been many fish alert indicators, particularly for ice fishing, but this invention relates particularly to a simple inexpensive device giving both visual and audible signals and mountable directly on a fishing rod or on other similar devices.

SUMMARY OF THE DISCLOSURE

A light-weight channel of appropriate material such as aluminum or plastic is provided exteriorly of the bottom of the channel with a grip clip that is swiveled thereto for swinging 180° so that the channel can be attached to a fishing rod in off-set relation thereto at either side of the rod. A signal, e.g. a bell is mounted on a flat elongated spring attached to the channel bottom at one end and extends to the opposite end of the channel where it terminates in a free end. A trip adjacent the free end of the spring is mounted in the sides of the channel on an axis transverse of the channel and has a temporary line grip outboard of the channel. When a fish takes the bait, the line tends to go out and the trip is pulled by the line to release the spring which springs up to cause the bell to ring and indicate visually that the line has pulled free from the line grip on the trip.

In one position of the clip that grips the rod, the line grip is located just above the rod. For reels that are located above the rod, i.e., a bait casting rod, and at the 180° position, the line grip is positioned outboard of the rod for reels under the rod as in some spinning reels and practically all fly reels.

The flat free ended spring is adjustable lengthwise of the channel and has a detent adjacent its free end to better hold the trip, if desired, in the presence of high winds that might tend to cause the trip to release the spring even though no strike should occur.

PREFERRED EMBODIMENT OF THE INVENTION

Figure 1:
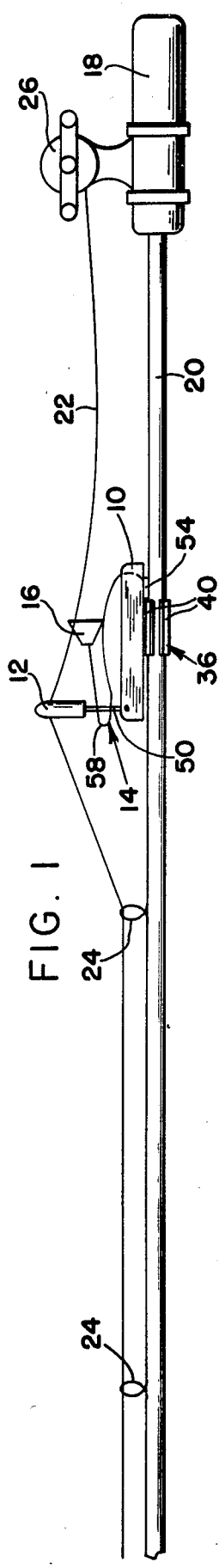
FIG. 1 is a side elevational view of the new indicator in cooperation with a reel on top of the rod.

FIG. 1 shows the channel 10, line grip 12, flat spring 14, bell 16, rod hand grip 18, rod 20, line 22, line rings 24 and fishing line storing reel 26 attached to the rod grip on top of the rod. The rings 24 are also on top of the rod. This shows a bait casting rod and bait casting reel, for example.

Figure 2:
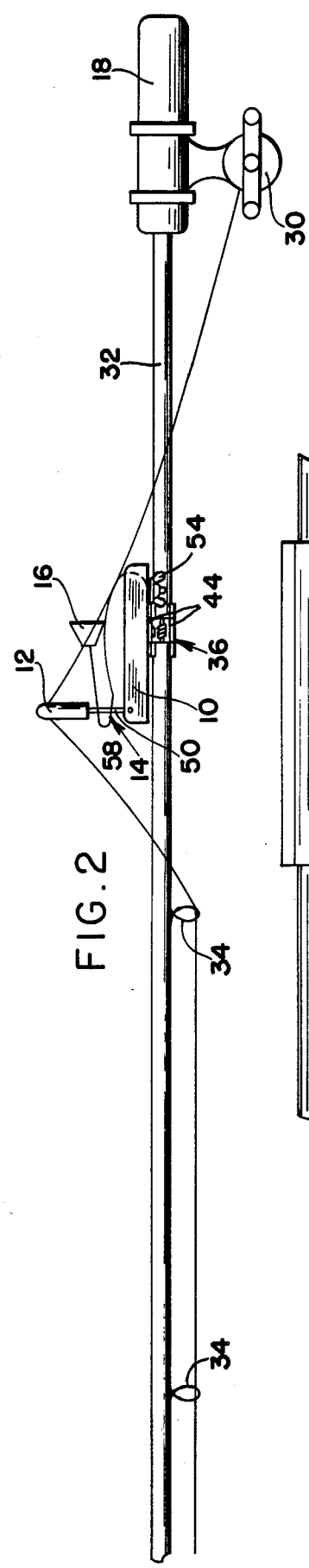
FIG. 2 is a similar view with a reel under the rod.

FIG. 2 shows the same thing except in this case the fishing line storing reel 30 is a fly casting reel and the rod 32 is a fly casting rod with rings 34 beneath. The rods and reels (and others) are well known to the sport fisherman and need no further description, except that fly lines, bait casting lines, and spinning lines (monofilament) are all different but also well known, and any type of line can be used with this invention. A rod clip 36 is mounted on the bottom of the channel.

Figure 4:
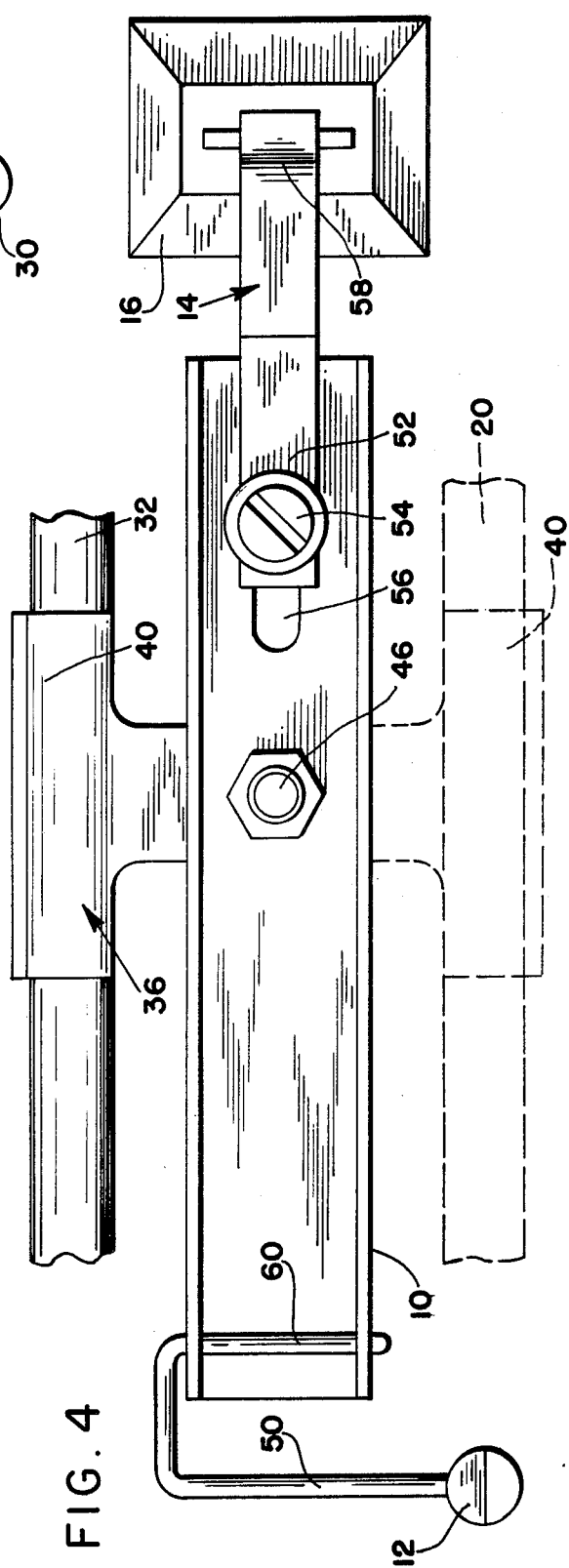
FIG. 4 is a top plan view showing the indicator released.
Figure 6:
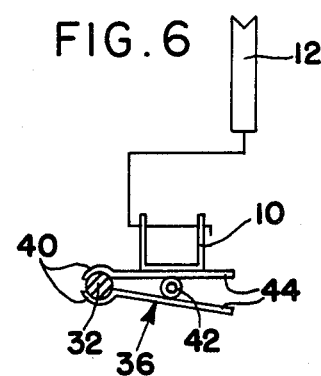
FIGS. 6 and 7 are diagrammatic views illustrating the two different positions of the indicator on the fishing rods.
Figure 7:
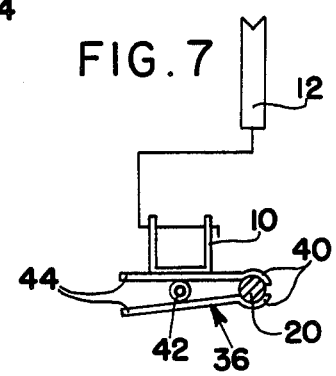

This rod clip can be anything that connects the indicator device to the rod and which can quickly and easily attach the same together. The one shown has rod gripping members 40, spring 42, and finger operator members 44, but the main feature of this grip is that it can be pivoted about a securing element 46 in the bottom of the channel into opposite positions 180° apart; note the solid and dotted line positions in FIG. 4. In the solid line position of rod grip 36, the device is mounted on rod 32 so that line grip 12 is well offset from the axis of rod 32. In this position, the line is gripped with no interference even though the reel 30 is underneath the rod. In the dotted line position of the rod grip 36, the line grip 12 is co-planar with the rod and since both reel 26 and the line grip are at the same side of the rod, the line from reel 26 has no impediment. These relations are also shown diagrammatically in FIGS. 6 and 7. Hence, in either case, it is easy to cast the lure in the usual manner and then apply the indicator to the rod and the line to the line grip which has a Vee shaped slot in a rubber element mounted on wire 50 which is in the form of a U with the leg the line clip is on longer and bent at 90°.

Figure 3:
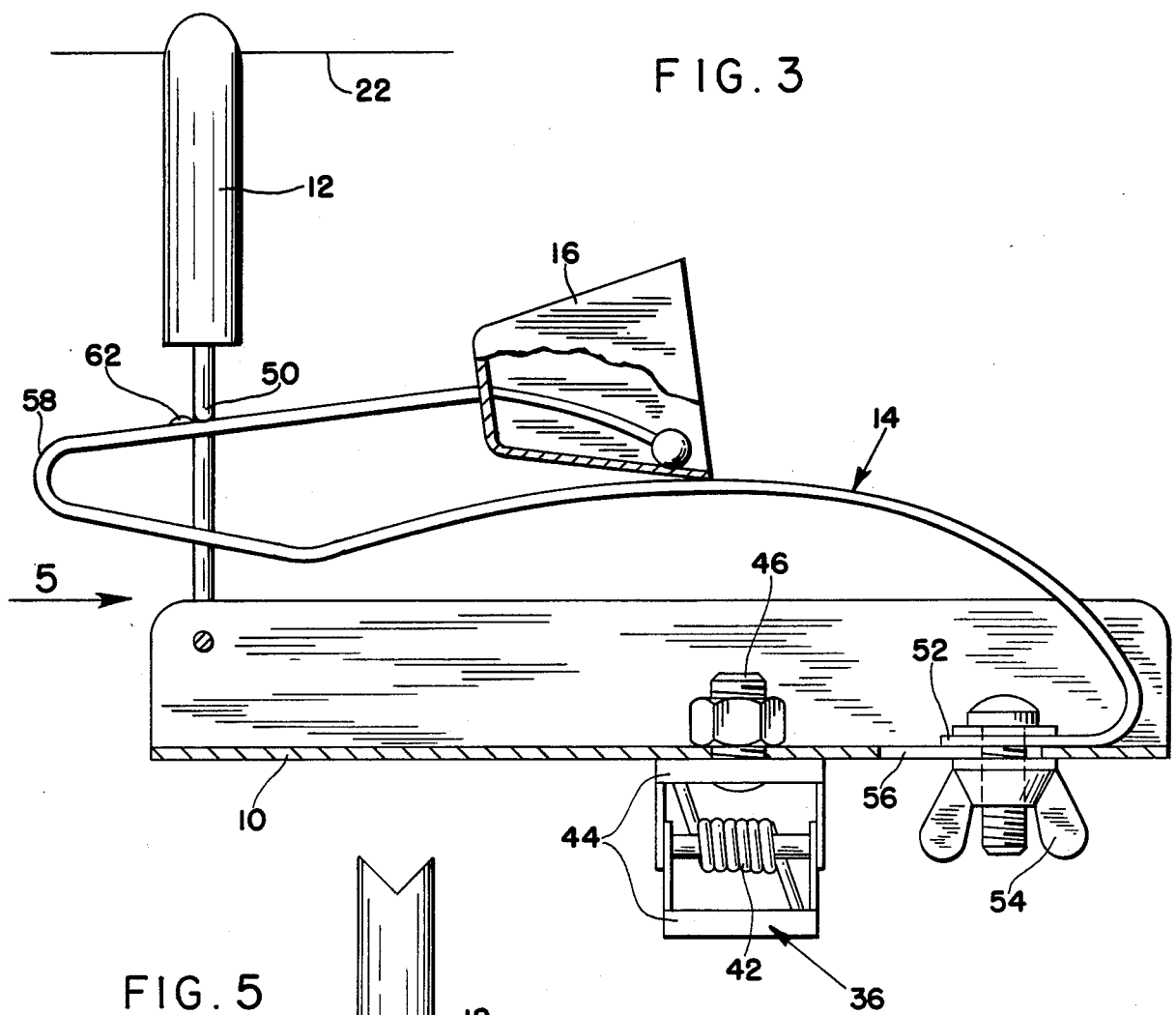
FIG. 3 is a longitudinal sectional view showing the indicator set.
Figure 5:
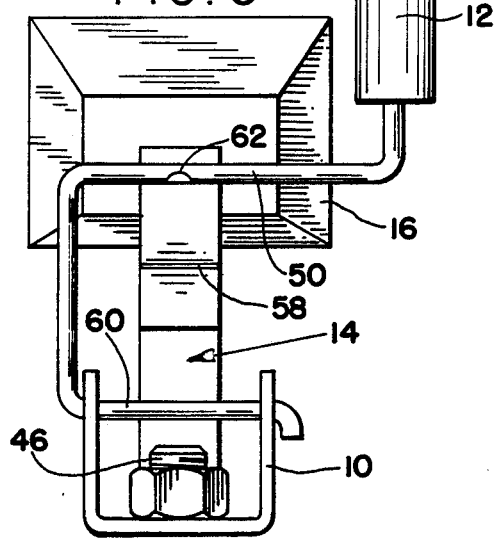
FIG. 5 is a front view looking in the direction of arrow 5 in FIG. 3.

The flat wire 14 is preferably of risilient ribbon stock bent at one end at 52 and secured by a releasable fastener 54 extending through an adjustment slot 56 in the bottom of the channel. From 52, the wire extends to a bend 58 reversing the direction of the wire and terminating with the bell 16. The wire 50 having short leg 60 is mounted to turn in holes in the sides of the channel from vertical FIG. 3, lightly holding flat wire 14 as shown in FIG. 3, against its own resiliency. With the baited line caught in rubber grip 12, a fish run will pull on the line and cause wire 50 to pivot to horizontal position, FIG. 4, and release the line. The resilient flat wire 14 springs anti-clockwise to upright position, and the bell sounds. The bell is conveniently painted a bright color or a fluorescent. A small dent or the like as at 62 may be imparted to the flat wire to better hold line grip wire 50 in case of high winds and thus possible malfunction in which case the flat wire 14 is bodily adjusted to a position wherein the dent is located just to the left of wire 50 in FIG. 3, but if this cautionary effect is not wanted, the flat wire 14 is adjusted longitudinally of the channel so that the dent is removed sufficiently from wire 50 so that it does not have any holding effect thereon when a fish runs with the bait.

The present signal device is very simple in construction and operation; it can be placed on the rod after a cast or can be on the rod without being used at all; it can be used by the blind and other handicapped persons and can be used to fish from a building of any kind or from an automobile. It can be used on any fishing rod with any kind of equipment without interference and does not have to be watched. One fisherman can use several rods because no attention is necessary.

I claim:

1. A fishing strike indicator comprising a channel including a bottom and sides, an elongated spring wire having a free end and a connection to the bottom of the channel at the opposite end, the wire being resilient and normally standing generally upright, an audible and visual signal at the free end of the wire, said connection being located adjacent one end of the channel, a trip comprising a member located transversely of the channel adjacent the other end thereof and rotably mounted in the sides of the channel, an extension on the trip extending across the sides of the channel in spaced relation thereto and being swingable with the rotary member and having two positions, said extension in one position being effective to constrain the elongated wire in a loaded condition generally parallel to the channel, and in the other position releasing the wire to spring upright generally at right angles to the channel, a releasable spring clip attached to the bottom of the channel exteriorly thereof to releasably connect the indicator as a whole to a fishing rod, the elongated wire being doubled on itself so that the terminal end and audible signal lie between the trip and the connection of the elongated wire to the bottom of the channel, and the doubled area of the elongated wire extends past the trip in wire loading condition thereof, the trip extension engaging the doubled part of the elongated wire in set condition; and a fishing line, a repository therefor, and resilient releasable fishing line catch means on the extension, whereby the latter is rotated away from the elongated wire upon a pull on the line and clears the doubled part of the elongated resilient wire.

2. The indicator of claim 1 including a dimple on the doubled part of the wire to aid in impeding the release of the elongated wire.

3. The indicator of claim 2 wherein the connection of the elongated resilient wire is adjustable in a direction along the channel.

4. The indicator of claim 3 wherein the elongated resilient wire is flat ribbon stock.

5. The indicator of claim 1 wherein the audible signal is a bell.

6. An indicator for audibly and visually indicating a strike by a fish on a bait on a fishing line comprising:

a channel having a bottom and sides at the edges thereof, a rod grip on the bottom, said grip being rotatable 180° on an axis perpendicular to the bottom, an enlarged resilient wire having a bell at one end and a fastening at the other end, said fastening cooperating with a longitudinal slot in the bottom near an end thereof for connecting the wire to the channel bottom in lengthwise adjustment with respect thereto, said wire having a doubled over portion between the bell and the connection, the doubled over portion extending beyond the end of the channel opposite the end including the slot when bent over horizontally, the bell lying intermediate the doubled portion and the connection, said wire normally extending generally upright, a trip for the wire located in the channel adjacent the end opposite the connection and serving to releasably catch the wire in its horizontal set condition, a line catch on the trip, said trip being movable under influence of the line when a fish takes the bait to release the wire freeing it and causing the wire to spring up to normal condition causing the bell to ring.

7. The indicator of claim 6 wherein the trip is mounted in the sides of the channel to rotate thereon.

8. The indicator of claim 6 including a dent in the wire to engage the trip when set to yieldably resist release thereof from the wire.

9. The indicator of claim 8 wherein the wire is flat.

* * * * *